(12) United States Patent
Tokuyama et al.

(10) Patent No.: US 11,180,217 B2
(45) Date of Patent: Nov. 23, 2021

(54) MULTIPLE BICYCLE SPROCKET ASSEMBLY

(71) Applicant: Shimano Inc., Osaka (JP)

(72) Inventors: Koji Tokuyama, Osaka (JP); Kenji Ose, Osaka (JP); Toshinari Oishi, Osaka (JP); Kenji Kamada, Osaka (JP); Sota Yamaguchi, Osaka (JP)

(73) Assignee: Shimano Inc., Osaka (JP)

( * ) Notice: Subject to any disclaimer, the term of this patent is extended or adjusted under 35 U.S.C. 154(b) by 462 days.

(21) Appl. No.: 16/008,884

(22) Filed: Jun. 14, 2018

(65) Prior Publication Data

US 2018/0290711 A1 Oct. 11, 2018

Related U.S. Application Data

(63) Continuation of application No. 14/943,303, filed on Nov. 17, 2015, now Pat. No. 10,059,400.

(30) Foreign Application Priority Data

Dec. 15, 2014 (DE) .......................... 102014018568.0
Jul. 1, 2015 (DE) .......................... 102015008454.2

(51) Int. Cl.
*B62M 9/10* (2006.01)

(52) U.S. Cl.
CPC .................................... *B62M 9/10* (2013.01)

(58) Field of Classification Search
CPC ........ B62M 9/10; B62M 9/12; B62M 9/1242; F16H 55/30; F16H 9/24; F16H 2009/245
See application file for complete search history.

(56) References Cited

U.S. PATENT DOCUMENTS

| | | | |
|---|---|---|---|
| 3,583,249 A | 6/1971 | Morse | |
| 3,748,916 A | 7/1973 | Morse | |
| 5,413,534 A | 5/1995 | Nagano | |
| 5,954,604 A | 9/1999 | Nakamura | |
| 7,011,592 B2 | 3/2006 | Shahana et al. | |
| 10,059,400 B2* | 8/2018 | Tokuyama | B62M 9/10 |
| 2009/0042680 A1 | 2/2009 | Valle | |
| 2012/0302384 A1 | 11/2012 | Braedt | |
| 2016/0280326 A1 | 9/2016 | Braedt et al. | |
| 2017/0029066 A1 | 2/2017 | Fukunaga et al. | |
| 2017/0233037 A1 | 8/2017 | Hara | |

FOREIGN PATENT DOCUMENTS

| | | |
|---|---|---|
| CN | 1517268 A | 8/2004 |
| EP | 1 342 657 A2 | 9/2003 |
| TW | I337965 B | 3/2011 |

OTHER PUBLICATIONS

SRAM Alloy Road Bicycle Chainring—110 mm B/CD—50T extract from Amazon.com, Dec. 5, 2017.

* cited by examiner

*Primary Examiner* — Michael R Mansen
*Assistant Examiner* — Robert T Reese
(74) *Attorney, Agent, or Firm* — Global IP Counselors, LLP

(57) ABSTRACT

A multiple bicycle sprocket assembly is basically provided that is capable of creating a gear ratio in a wide range. The multiple bicycle sprocket assembly includes a first sprocket and a second sprocket. The first sprocket includes a first tooth number that is less than or equal to ten. The second sprocket includes a second tooth number that is more than or equal to forty-four.

9 Claims, 9 Drawing Sheets

MULTIPLE BICYCLE SPROCKET ASSEMBLY

CROSS-REFERENCE TO RELATED APPLICATIONS

This application is a continuation application of U.S. patent application Ser. No. 14/943,303 filed on Nov. 17, 2015, which claims priority to German Patent Application No. DE102014018568.0, filed on Dec. 15, 2014 and German Patent Application No. DE102015008454.2, filed on Jul. 1, 2015. The entire disclosures of U.S. patent application Ser. No. 14/943,303, and German Patent Application Nos. DE102014018568.0 and DE102015008454.2 are hereby incorporated herein by reference.

BACKGROUND

Field of the Invention

This invention generally relates to a multiple bicycle sprocket assembly. More specifically, the present invention relates to a multiple bicycle sprocket assembly having a rotational central axis and configured to be mounted on a bicycle hub assembly. Background Information A plurality of rear sprockets are attached to a bicycle rear hub assembly (see EP1342657A2). The respective rear sprockets have different numbers of teeth. A combination of the numbers of teeth of the respective rear sprockets, that is, a tooth combination of the rear sprockets is set according to a characteristic of a course, for example.

In the case in which a rider attaches importance to riding at a high speed in a course having many flat roads or the like, generally, a sprocket having a small number of teeth is used for the rear sprocket on a top side. On the other hand, in the case in which the rider attaches importance to comfortable riding in a course having many uphills or the like, a sprocket having a large number of teeth is used for the rear sprocket on a low side.

In the conventional rear sprocket, it is possible to constitute a gear ratio which attaches importance to a speed, but it is difficult to constitute the gear ratio at which pedal stepping is very light. On the other hand, in the conventional rear sprocket, it is possible to constitute the gear ratio at which the pedal stepping is very light, but it is difficult to constitute the gear ratio which attaches importance to the speed. In other words, the conventional rear sprocket does not have such a configuration as to simultaneously satisfy both of the gear ratio which attaches importance to the speed and the gear ratio at which the pedal stepping is light.

In consideration of the problem, it is an object of the present invention to provide a multiple bicycle sprocket assembly capable of constituting a gear ratio in a wide range.

SUMMARY

Generally, the present disclosure is directed to various features of a multiple bicycle sprocket assembly.

A multiple bicycle sprocket assembly according to the present invention has a rotational central axis and is configured to be mounted on a bicycle hub assembly. The multiple bicycle sprocket assembly comprises a first sprocket and a second sprocket. The first sprocket has a first tooth number that is less than or equal to ten. The second sprocket has a second tooth number that is more than or equal to forty-four.

In the multiple bicycle sprocket assembly, the first tooth number of the first sprocket is less than or equal to ten. The second tooth number of the second sprocket is more than or equal to forty-four. In the multiple bicycle sprocket assembly, consequently, it is possible to constitute a gear ratio in a wider range as compared with the conventional configuration.

The multiple bicycle sprocket assembly of the present invention may be configured as follows. The first tooth number is ten that is the smallest tooth number. The second tooth number is fifty that is the largest tooth number. In this preferred multiple bicycle sprocket assembly, consequently, it is possible to constitute a gear ratio in a wider range.

The multiple bicycle sprocket assembly of the present invention may be configured as follows. The multiple bicycle sprocket assembly further comprises at least eight additional sprockets. The at least eight additional sprockets are positioned between the first sprocket and the second sprocket in an axial direction parallel to the rotational central axis. With this structure, it is possible to constitute a gear ratio in a wide range, and furthermore, to smoothly change the gear ratio between the first sprocket and the second sprocket.

The multiple bicycle sprocket assembly of the present invention may be configured as follows. The multiple bicycle sprocket assembly further comprises five additional sprockets. The five additional sprockets are positioned between the first sprocket and the second sprocket in an axial direction parallel to the rotational central axis. The total sprocket number is seven. With this structure, it is possible to constitute a gear ratio in a wide range while still achieving a low profile design of the multiple sprocket assembly in the axial direction with respect to the rotational central axis, and furthermore, to smoothly change the gear ratio between the first sprocket and the second sprocket.

The multiple bicycle sprocket assembly of the present invention may be configured as follows. The multiple bicycle sprocket assembly further comprises at least nine additional sprockets. The at least nine additional sprockets are positioned between the first sprocket and the second sprocket in an axial direction parallel to the rotational central axis. The total sprocket number is eleven. With this structure, it is possible to constitute a gear ratio in a wide range, and furthermore, to smoothly change the gear ratio between the first sprocket and the second sprocket.

The multiple bicycle sprocket assembly of the present invention may be configured as follows. The multiple bicycle sprocket assembly further comprises ten additional sprockets. The ten additional sprockets are positioned between the first sprocket and the second sprocket in an axial direction parallel to the rotational central axis. The total sprocket number is twelve. With this structure, it is possible to constitute a gear ratio in a wider range, and furthermore, to change the gear ratio more smoothly between the first sprocket and the second sprocket.

The multiple bicycle sprocket assembly of the present invention may be configured as follows. The axial length of each space between axially adjacent sprockets is 2.18 mm.

The multiple bicycle sprocket assembly of the present invention may be configured as follows. The axial length of each space between axially adjacent sprockets is 2.2 mm.

The multiple bicycle sprocket assembly of the present invention may be configured as follows. The axial thickness of each of the first sprocket, the second sprocket and the additional sprockets is 1.6 mm.

The multiple bicycle sprocket assembly of the present invention may be configured as follows. The first sprocket and the second sprocket are axially spaced apart such that a total axial length between the first sprocket and the second sprocket is 39.4 mm when the total sprocket number is eleven.

The multiple bicycle sprocket assembly of the present invention may be configured as follows. The second sprocket includes at least one shift assist projection. Consequently, it is possible to smoothly move a chain from a smaller adjacent sprocket to the second sprocket.

The multiple bicycle sprocket assembly of the present invention may be configured as follows. The first sprocket is configured to be mounted to the bicycle hub assembly via a mounting adapter. Even if the number of the sprockets is increased, consequently, the sprockets can easily be attached to the hub assembly.

The multiple bicycle sprocket assembly of the present invention may be configured as follows. The first sprocket and the second sprocket are axially spaced apart such that a total axial length between the first sprocket and the second sprocket is 43.4 mm when the total sprocket number is twelve.

The multiple bicycle sprocket assembly of the present invention may be configured as follows. The second tooth number is more than or equal to fifty. With this structure, it is possible to constitute a gear ratio in a wide range.

In the multiple bicycle sprocket assembly according to the present invention, it is possible to constitute a gear ratio in a wider range. In the multiple bicycle sprocket assembly according to the present invention, moreover, it is possible to change the gear ratio more smoothly between the first sprocket and the second sprocket.

Also other objects, features, aspects and advantages of the disclosed a multiple bicycle sprocket assembly will become apparent to those skilled in the art from the following detailed description, which, taken in conjunction with the annexed drawings, discloses selected illustrative embodiments of the multiple bicycle sprocket assembly.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
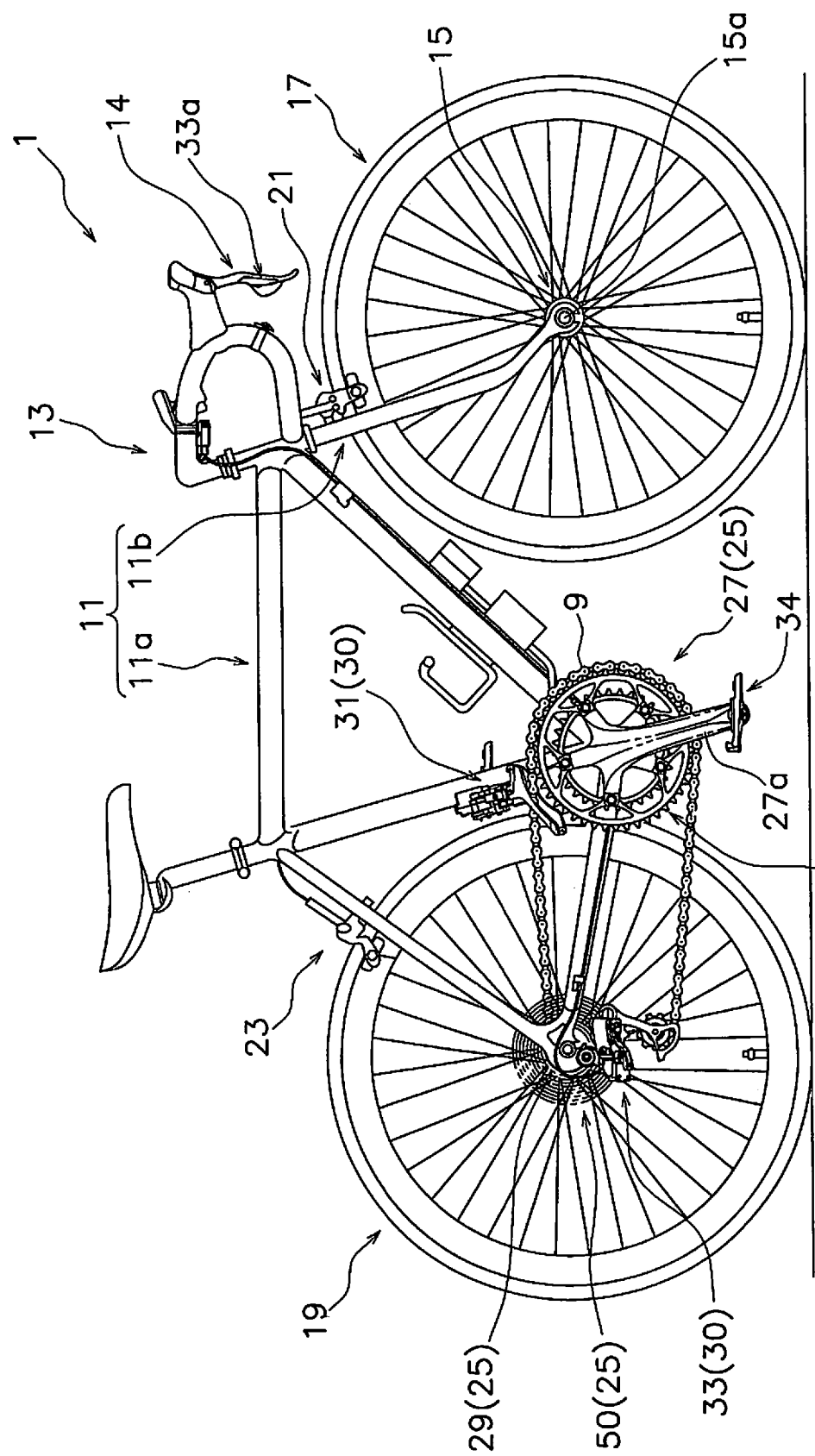
FIG. 1 is a side elevational view of a bicycle that is equipped with a multiple bicycle sprocket assembly in accordance with first to fifth illustrated embodiments.

Referring initially to FIG. 1, a bicycle 1 is illustrated that is configured in accordance with a first embodiment. The bicycle 1 mainly includes a frame 11, a handle 13, a front hub assembly 15, a rear hub assembly 29, front and rear wheels 17, 19, front and rear brake devices 21, 23, a gear change portion 30, and a driving portion 25.

The frame 11 has a frame body 11a and a front fork 11b. The front fork 11b is rotatably attached to the frame body 11a. The handle 13 is fixed to the front fork 11b.

The front hub assembly 15 is supported on the front fork 11b. The front hub assembly 15 mainly has a front hub shaft 15a and a front hub shell (not shown). Both ends of the front hub shaft 15a are held on the front fork 11b. The front hub shell is provided rotatably with respect to the front hub shaft 15a. The front wheel 17 (e.g. spokes) is attached to the front hub shell.

The front and rear wheels 17, 19 are rotatably attached to the front fork 11b and a rear portion of the frame 11 through the front hub assembly 15 and the rear hub assembly 29, respectively.

The front and rear brake devices 21, 23 are operated by manipulation of a brake lever 14. Since the front and rear brake devices 21, 23 have the same configuration as those in the conventional configuration, description will be omitted.

The gear change portion 30 is attached to the frame 11. The gear change portion 30 includes a front derailleur 31 and a rear derailleur 33. The front derailleur 31 moves a bicycle chain 9 from a front sprocket to an adjacent front sprocket by a shift operation of a shift lever (not shown) attaching to, e.g. the left side of the handle 13. The front derailleur 31 is attached to a seat tube of the frame 11 in the illustrated embodiment. The rear derailleur 33 moves the bicycle chain 9 from a rear sprocket to an adjacent rear sprocket by a shift operation of a shift lever 33a attaching to, e.g. the right side of the handle 13. The rear derailleur 33 is attached to a connecting portion of a chain stay and a seat stay of the frame 11.

The driving portion 25 mainly has a crank assembly 27, a rear hub assembly 29 and a rear sprocket assembly 50 (an example of a multiple bicycle sprocket assembly).

The crank assembly 27 includes a crank shaft (not shown), a right crank arm 27a and a left crank arm (not shown). The crank shaft is rotatably supported on a lower portion of the frame 11, for example, on a bottom bracket hanger portion. Base ends of the right crank arm 27a and the left crank arm are attached unrotatably to both ends of the crank shaft, respectively. A pedal 34 is attached to distal end of the right crank arm 27a and distal end of the left crank arm. A front sprocket assembly 27b having the same configuration as that in the conventional configuration is attached to the right crank arm 27a so as to be integrally rotatable. The front sprocket assembly 27b has at least one front sprocket. For example, the front sprocket assembly 27b has two front sprockets in the illustrated embodiment.

Figure 2:
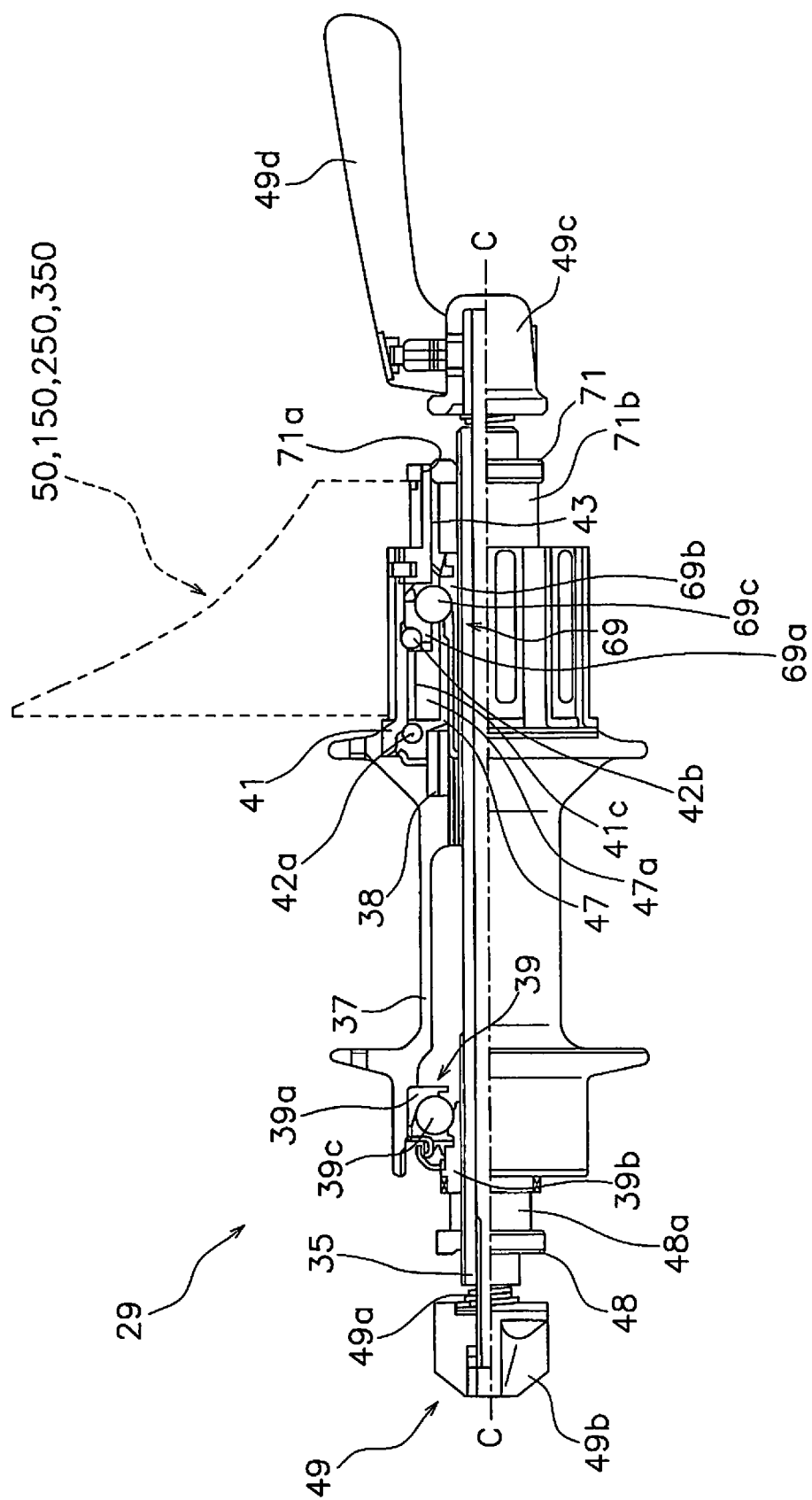
FIG. 2 is a detailed view of a rear hub assembly according to the first to the fifth embodiments.

As shown in FIGS. 1 and 2, the rear hub assembly 29 is supported on the rear part of the frame 11. The rear hub assembly 29 has a rear hub shaft 35, a rear hub shell 37, a first tubular member 41 and a second tubular member 43 (an example of a mounting adapter).

The rear hub shaft 35 is held on the rear part of the frame 11 with a conventional wheel securing mechanism 49. The wheel securing mechanism 49 is the same as the conventional mechanism. The wheel securing mechanism 49 has a draw bar 49a, a stationary nut 49b and a movable nut 49c, for example. The draw bar 49a is extended along the rear hub shaft 35. The stationary nut 49b is screwed at one of ends of the draw bar 49a. The movable nut 49c is disposed on the other end of the draw bar 49a. The movable nut 49c is movable in an axial direction by a conventional cam mechanism.

The stationary nut 49b and the movable nut 49c clamp the rear hub shaft 35 to the frame 11 when a lever 49d is operated.

The rear hub shell 37 is supported rotatably with respect to the rear hub shaft 35. The rear wheel 19 (e.g. spokes) is attached to the rear hub shell 37.

The rear hub shell 37 is rotatable around a shaft center C (an example of a rotational central axis) of the rear hub shaft 35. One of ends (a left side in FIG. 2) of the rear hub shell 37 is rotatably supported on the rear hub shaft 35 through a bearing assembly 39. An outer race 39a of the bearing assembly 39 is fixed to an inner peripheral surface at one of the ends of the rear hub shell 37. An inner race 39b of the bearing assembly 39 is fixed to the rear hub shaft 35 by a lock nut 48 and spacer 48a. Ball bearings 39c are disposed between the outer race 39a of the bearing assembly 39 and the inner race 39b of the bearing assembly 39.

On the other hand, the other end (a right side in FIG. 2) of the rear hub shell 37 is unrotatably supported on an inner member 47 disposed on an inner peripheral side of the first tubular member 41 (described later) by a spline structure 38. The spline structure 38 comprises splines on an inner peripheral surface at the other end of the rear hub shell 37 and splines on an outer peripheral surface at one of ends (the left side in FIG. 2) of the inner member 47.

The inner member 47 is rotatable around the shaft center C of the rear hub shaft 35. For example, the other end (the right side in FIG. 2) of the inner member 47 is rotatably supported on the rear hub shaft 35 through the bearing assembly 69. An outer race 69a of the bearing assembly 69 is fixed to an outer peripheral surface at the other end of the inner member 47. An inner race 69b of the bearing assembly 69 is fixed to the rear hub shaft 35 by a lock nut 71 and a spacer 71b. Ball bearings 69c are disposed between the outer race 69a of the bearing assembly and the inner race 69b of the bearing assembly. Thus, the other end of the rear hub shell 37 and the inner member 47 are rotatably supported on the rear hub shaft 35 through the bearing assembly 69. Ratchet pawls 47a are formed on the outer peripheral portion of the inner member 47.

Figure 3:
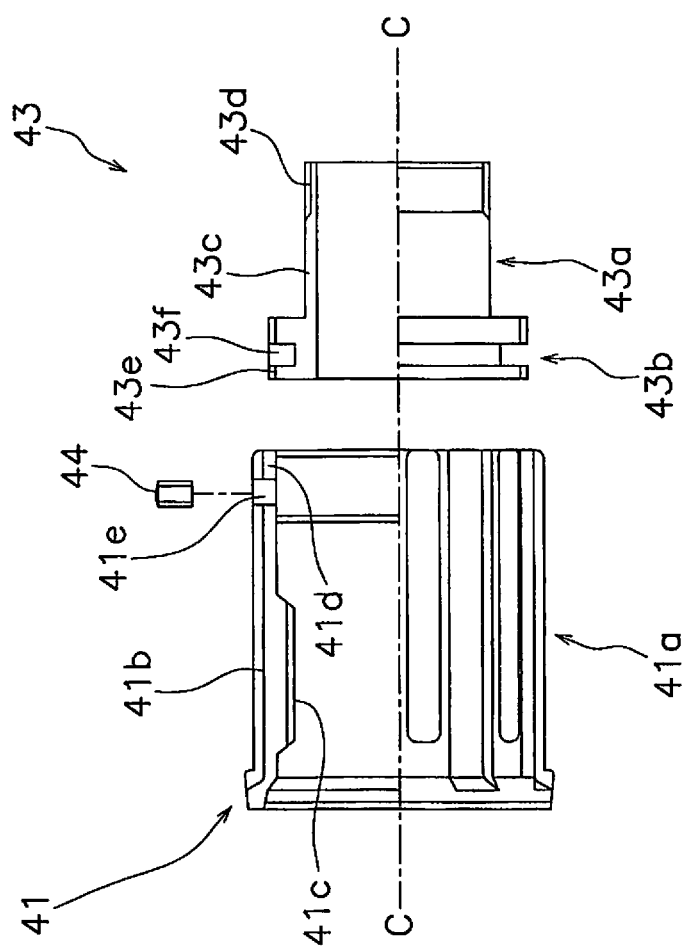
FIG. 3 is an exploded view of a first tubular member and a second tubular member on the rear hub assembly according to the first to the fifth embodiments.

The first tubular member 41 is rotatable around the shaft center C of the rear hub shaft 35 as shown in FIG. 3. The first tubular member 41 has a first body portion 41a, a plurality of first splines 41b, a plurality of ratchet teeth 41c and a first female screw portion 41d. The first body portion 41a is formed in a tubular shape. The first splines 41b are formed integrally with the outer peripheral portion of the first body portion 41a. A rear sprocket assembly 50 (a first rear sprocket assembly 51; described later) is mounted to the first splines 41b.

The ratchet teeth 41c are formed integrally with the inner peripheral portion of the first body portion 41a. The ratchet teeth 41c are engaged with the ratchet pawls 47a of the inner member 47. A one-way clutch used conventionally is configured by the engagement of the ratchet teeth 41c and the ratchet pawls 47a.

The first female screw portion 41d is formed on an inner peripheral surface at the end of the first body portion 41a, for example, an inner peripheral surface at the end of the second tubular member 43 side. A second male screw portion 43e (described later) of the second tubular member 43 is screwed with the first female screw portion 41d. Moreover, a screw hole portion 41e is formed at the end where the first female screw portion 41d is formed on the first body portion 41a. The screw hole portion 41e penetrates from the outer peripheral surface toward the inner peripheral surface.

The first body portion 41a is rotatably supported on the inner member 47 through ball bearings 42a, 42b. For example, the ball bearings 42a, 42b are disposed on both sides of the ratchet teeth 41c in a direction along the rotation axis of the first body portion 41a. The ball bearings 42a are disposed between the inner peripheral surface of the first body portion 41a and one end side (the left side in FIG. 2) of the outer peripheral portion of the inner member 47. Moreover, the ball bearings 42b are disposed between the inner peripheral surface of the first body portion 41a and an outer race 69a of the bearing assembly 69.

The second tubular member 43 is rotatable around the shaft center C of the rear hub shaft 35. The second tubular member 43 has a second body portion 43a, a coupling portion 43b, a plurality of second splines 43c, and a first male screw portion 43d. The second body portion 43a is formed in a tubular shape. The outside diameter of the second body portion 43a is smaller than the outside diameter of the first body portion 41a. The coupling portion 43b is coupled to the first tubular member 41 (the first body portion 41a). The coupling portion 43b is formed in a flange shape and is provided integrally with one of the ends (the left side in FIG. 2) of the second body portion 43a. The second male screw portion 43e is formed on the outer peripheral portion of the coupling portion 43b. Moreover, a groove portion 43f extended in a circumferential direction is formed on the outer peripheral portion of the coupling portion 43b.

The second male screw portion 43e is screwed into the first female screw portion 41d of the first tubular member 41 (the first body portion 41a). In this condition, a clamping member such as a screw member 44 is screwed into the screw hole portion 41e of the first tubular member 41 (the first body portion 41a) and is engaged with the groove portion 43f. Thus, the first tubular member 41 and the second tubular member 43 are coupled to each other.

The second splines 43c are formed integrally with the outer peripheral portion of the second body portion 43a. A rear sprocket assembly 50 (a second rear sprocket assembly 52; described later) is attached to the second splines 43c.

The first male screw portion 43d is formed on the outer peripheral surface (the right side in FIG. 2) at the other end of the second body portion 43a. A second female screw portion 71a of a lock nut 71 is screwed to the first male screw portion 43d. For example, the second female screw portion 71a of the lock nut 71 is screwed to the first male screw portion 43d of the second tubular member 43 in a state in which the rear sprocket assembly 50 is mounted to the rear hub assembly 29 (the first tubular member 41 and the second tubular member 43).

The rear sprocket assembly 50 is configured to be mounted on the rear hub assembly 29. The rear sprocket assembly 50 has a rotational central axis. The rotational central axis corresponds to the rear hub shaft 35 or the shaft center C of the rear hub shaft 35.

The rear sprocket assembly 50 is mounted to the first tubular member 41 and the second tubular member 43. The rear sprocket assembly 50 has a plurality of rear sprockets 50A-50K.

Figure 4:
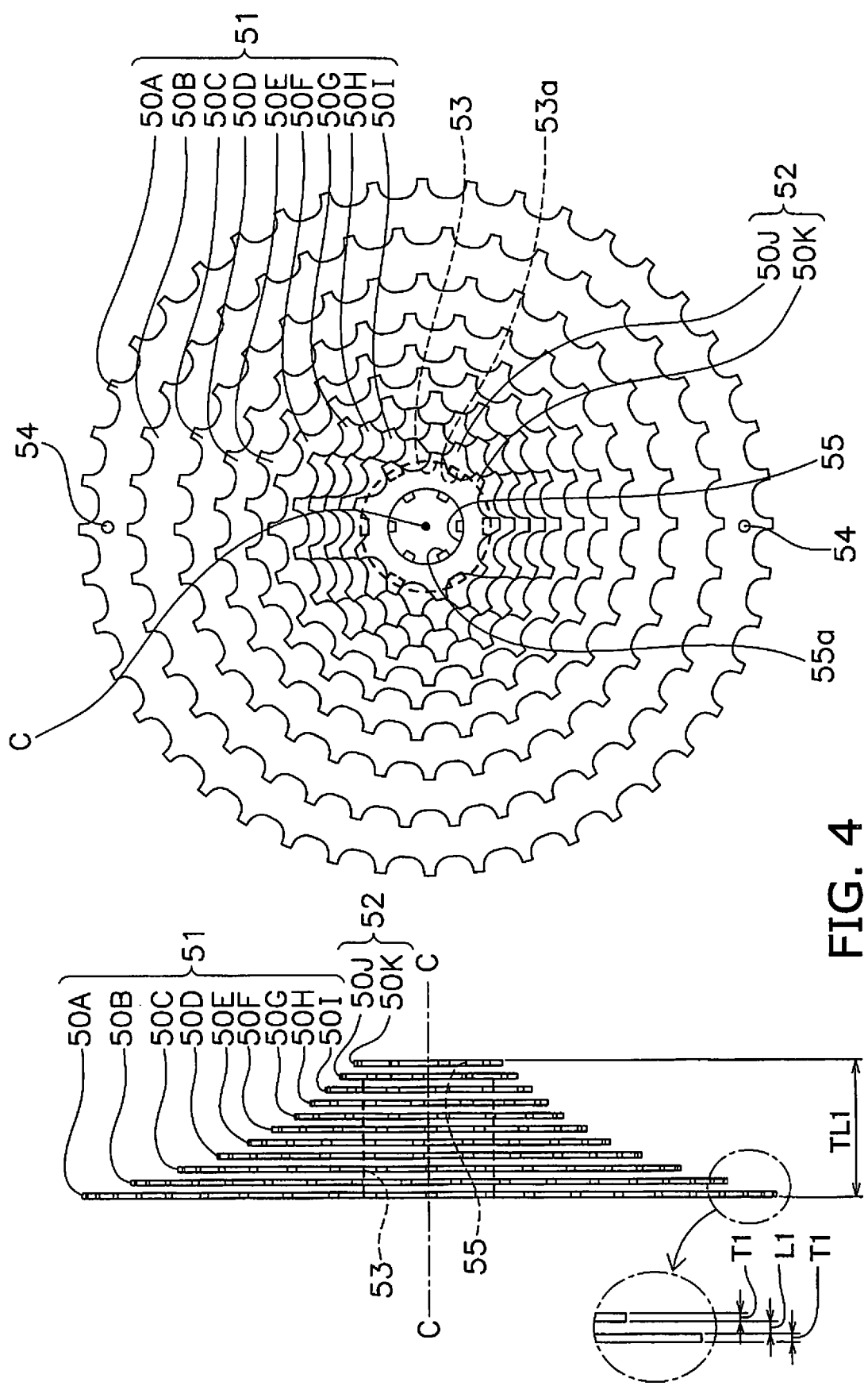
FIG. 4 is a front view and a side view of a rear sprocket assembly according to the first embodiment.

As shown in FIG. 4, the rear sprocket assembly 50 has a first rear sprocket assembly 51 and a second rear sprocket assembly 52.

The first rear sprocket assembly 51 is mounted to the first tubular member 41 (the first body portion 41a). The first rear sprocket assembly 51 has first to ninth rear sprockets 50A-50I. The first to ninth rear sprockets 50A-50I are arranged on the outer peripheral portion of the first tubular member 41 in an axial direction parallel to the shaft center C of the rear hub shaft 35. The first rear sprocket 50A is disposed on the outer peripheral portion of the first tubular member 41 on a side of the rear hub shell 37. A spacer (not shown) is disposed between two sprockets which are adjacent to each other in the first to ninth rear sprockets 50A-50I. Instead of such a spacer, some of the first to ninth rear sprockets 50A-50I may be fixed to a sprocket support member (not shown) such that the sprockets fixed to the sprocket support member are mounted to the first tubular member 41 through the sprocket support member.

More specifically, first hole portions 53 are formed on the respective inner peripheral portions of the first to ninth rear sprockets 50A-50I. A plurality of third splines 53a are formed on each of the first hole portions 53. The third splines 53a are engaged with the first splines 41b (see FIG. 3) on the first tubular member 41, respectively. Thus, the first to ninth rear sprockets 50A-50I are engaged with the first tubular member 41 so that the first to ninth rear sprockets 50A-50I are arranged on the outer peripheral portion of the first tubular member 41.

The second rear sprocket assembly 52 is attached to the second tubular member 43 (the second body portion 43a). The second rear sprocket assembly 52 has tenth and eleventh rear sprockets 50J, 50K. The tenth and eleventh rear sprockets 50J, 50K are arranged on the outer peripheral portion of the second tubular member 43 in the axial direction parallel to the shaft center C of the rear hub shaft 35. The tenth rear sprocket 50J is disposed on the outer peripheral portion of the second tubular member 43 so as to be adjacent to the ninth rear sprocket 50I in the axial direction. The eleventh rear sprocket 50K is disposed on the outer peripheral portion of the second tubular member 43 so as to be adjacent to the tenth rear sprocket 50J at the most distant position from the first rear sprocket 50A in the axial direction. A spacer (not shown) is disposed between the two sprockets which are adjacent to each other in the tenth and eleventh rear sprockets 50J, 50K.

More specifically, a second hole portion 55 is formed on the respective inner peripheral portions of the tenth and eleventh rear sprockets 50J, 50K. A plurality of fourth splines 55a are formed on the second hole portion 55. The fourth splines 55a are engaged with the second splines 43c of the second tubular member 43, respectively. Thus, the tenth and eleventh rear sprockets 50J, 50K are engaged with the second tubular member 43 so that the tenth and eleventh rear sprockets 50J, 50K are arranged on the outer peripheral portion of the second tubular member 43.

As described above, the first rear sprocket assembly 51 is attached to the first tubular member 41 (the first body portion 41a). Moreover, the second rear sprocket assembly 52 is attached to the second tubular member 43 (the second body portion 43a). In this condition, the lock nut 71 (the second female screw portion 71a; see FIG. 2) is screwed with the second tubular member 43 (the first male screw portion 43d) so that the rear sprocket assembly 50 (the first rear sprocket assembly 51 and the second rear sprocket assembly 52) is fixed to the rear hub assembly 29.

The first rear sprocket 50A is an example of a second sprocket. The second to ten rear sprockets 50B-50J are an example of at least five additional sprockets, at least eight additional sprockets, and nine additional sprockets. The eleventh rear sprocket 50K is an example of a first sprocket.

Layouts of the first to eleventh rear sprockets 50A-50K will be described below in detail. The first to eleventh rear sprockets 50A-50K are arranged on the first tubular member 41 and the second tubular member 43 in alphabetical order.

Specifically, the second to tenth rear sprockets 50B-50J are positioned between the first rear sprocket 50A and the eleventh rear sprocket 50K in the axial direction parallel to the shaft center C of the rear hub shaft 35. The second rear sprocket 50B is positioned between the first rear sprocket 50A and the third rear sprocket 50C in the axial direction. The third rear sprocket 50C is positioned between the second rear sprocket 50B and the fourth rear sprocket 50D in the axial direction. The fourth rear sprocket 50D is positioned between the third rear sprocket 50C and the fifth rear sprocket 50E in the axial direction. The fifth rear sprocket 50E is positioned between the fourth rear sprocket 50D and the sixth rear sprocket 50F in the axial direction.

The sixth rear sprocket 50F is positioned between the fifth rear sprocket 50E and the seventh rear sprocket 50G in the axial direction. The seventh rear sprocket 50G is positioned between the sixth rear sprocket 50F and the eighth rear sprocket 50H in the axial direction. The eighth rear sprocket 50H is positioned between the seventh rear sprocket 50G and the ninth rear sprocket 50I in the axial direction. The ninth rear sprocket 50I is positioned between the eighth rear sprocket 50H and the tenth rear sprocket 50J in the axial direction. The tenth rear sprocket 50J is positioned between the ninth rear sprocket 50I and the eleventh rear sprocket 50K in the axial direction.

In other words, the second rear sprocket 50B is positioned between the first rear sprocket 50A and the tenth rear sprocket 50J in the axial direction. The third rear sprocket 50C is positioned between the second rear sprocket 50B and the ninth rear sprocket 50I in the axial direction. The fourth rear sprocket 50D is positioned between the third rear sprocket 50C and the eighth rear sprocket 50H in the axial direction. The fifth rear sprocket 50E is positioned between the fourth rear sprocket 50D and the seventh rear sprocket 50G in the axial direction.

The sixth rear sprocket 50F is positioned between the fifth rear sprocket 50E and the seventh rear sprocket 50G in the axial direction. The seventh rear sprocket 50G is positioned between the fourth rear sprocket 50D and the eighth rear sprocket 50H in the axial direction. The eighth rear sprocket 50H is positioned between the third rear sprocket 50C and the ninth rear sprocket 50I in the axial direction. The ninth rear sprocket 50I is positioned between the second rear sprocket 50B and the tenth rear sprocket 50J in the axial direction. The tenth rear sprocket 50J is positioned between the first rear sprocket 50A and the eleventh rear sprocket 50K in the axial direction.

Finally, the configuration and the tooth combination of the first to eleventh rear sprocket 50A-50K will be described in detail. A root circle diameter of the first rear sprocket 50A is the largest in the first to eleventh rear sprocket 50A-50K. Root circle diameters of the second to tenth sprockets 50B-50J are gradually reduced in order of the second to tenth sprockets 50B-50J. A root circle diameter of the eleventh sprocket is the smallest in the first to eleventh rear sprocket 50A-50K.

The first rear sprocket 50A preferably includes at least one shift assist projection 54. The shift assist projection 54 catches the chain prior to sprocket teethe of the first sprocket 50A when the rear derailleur 33 moves the chain from the second rear sprocket 50B to the first rear sprocket 50A. For example, the first rear sprocket 50A includes two shift assist projections 54. The two shift assist projections 54 are provided on the outer peripheral portion of the first rear sprocket 50A on the side of the second rear sprocket 50B. The two shift assist projections 54 are disposed at a predetermined interval around the rear hub shaft 35 (in a circumferential direction).

The axial thickness T1 of each of the first to the eleventh rear sprockets 50A-50K is 1.6 mm. The axial length L1 of each space between the axially adjacent rear sprockets is 2.18 mm. The total axial length TL1 between the first rear sprocket 50A and the eleventh rear sprocket 50K is 39.4 mm. The total axial length TL1 represents a distance between a surface of the first rear sprocket 50A on an opposite side of the second rear sprocket 50B and a surface of the eleventh rear sprocket 50K on an opposite side to the tenth rear sprocket 50J.

The first rear sprocket 50A has a first tooth number (an example of a second tooth number). The first tooth number is more than or equal to forty-four. In the embodiment, for example, the first tooth number is forty-four that is the largest tooth number.

The second rear sprocket 50B has a second tooth number. The second tooth number is thirty eight. The third rear sprocket 50C has a third tooth number. The third tooth number is thirty two. The fourth rear sprocket 50D has a fourth tooth number. The fourth tooth number is twenty seven. The fifth rear sprocket 50E has a fifth tooth number. The fifth tooth number is twenty three. The sixth rear sprocket 50F has a sixth tooth number. The sixth tooth number is twenty. The seventh rear sprocket 50G has a seventh tooth number. The seventh tooth number is seventeen. The eighth rear sprocket 50H has an eighth tooth number. The eighth tooth number is fifteen. The ninth rear sprocket 50I has a ninth tooth number. The ninth tooth number is thirteen. The tenth rear sprocket 50J has a tenth tooth number. The tenth tooth number is eleven.

The eleventh rear sprocket 50K has an eleventh tooth number (an example of a first tooth number). The eleventh tooth number is less than or equal to ten. Specifically, the eleventh tooth number is less than or equal to nine. In the embodiment, for example, the eleventh tooth number is nine that is the smallest tooth number.

Second Embodiment

A configuration of a bicycle employing a second embodiment according to the present invention is substantially identical to that of the first embodiment except for a configuration of a rear sprocket assembly 150. For this reason, in the second embodiment, the rear sprocket assembly 150 will be described in detail and explanation of the other configuration will be omitted. The configurations omitted herein conform to the configuration according to the first embodiment. The same configurations as those in the first embodiment have the same reference numerals.

Figure 5:
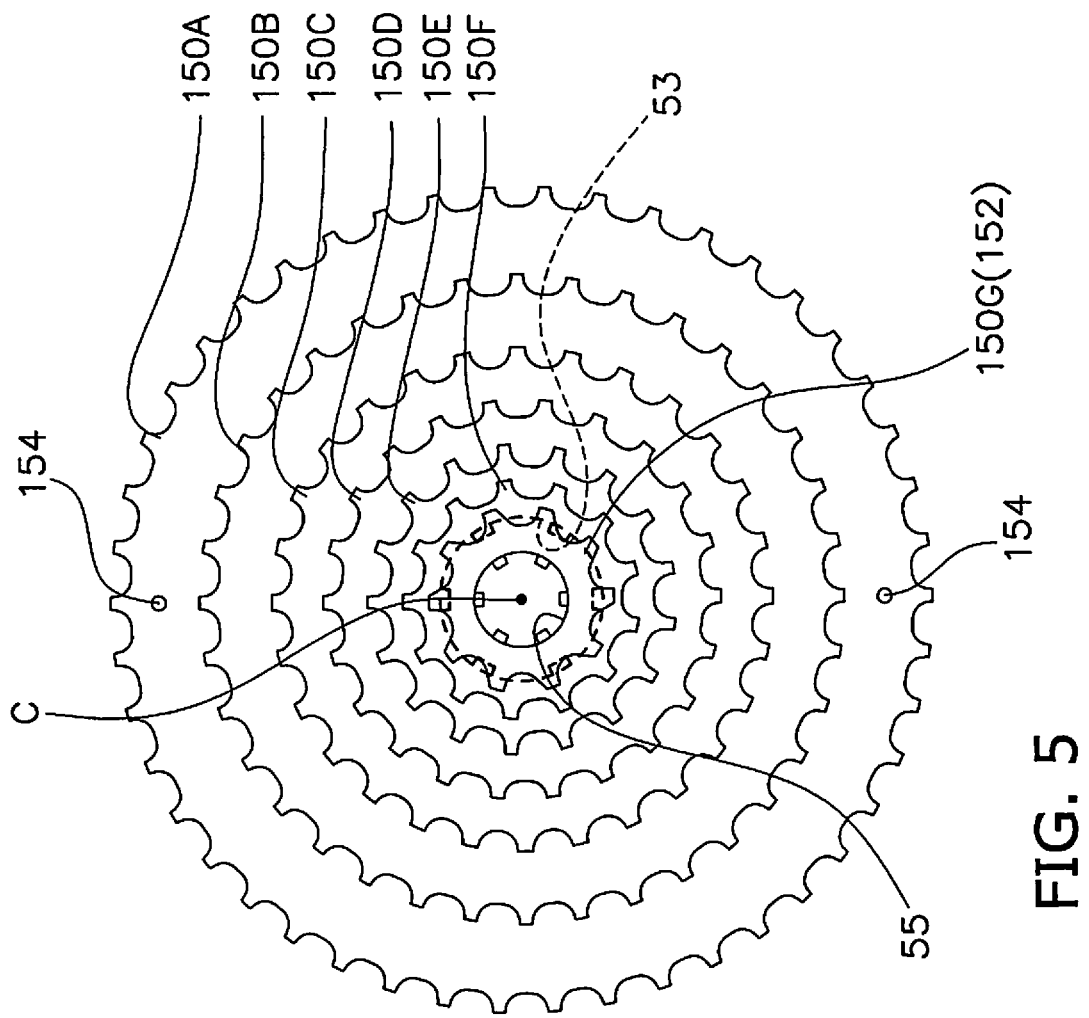
FIG. 5 is a front view and a side view of a rear sprocket assembly according to the second embodiment.
Figure 5:
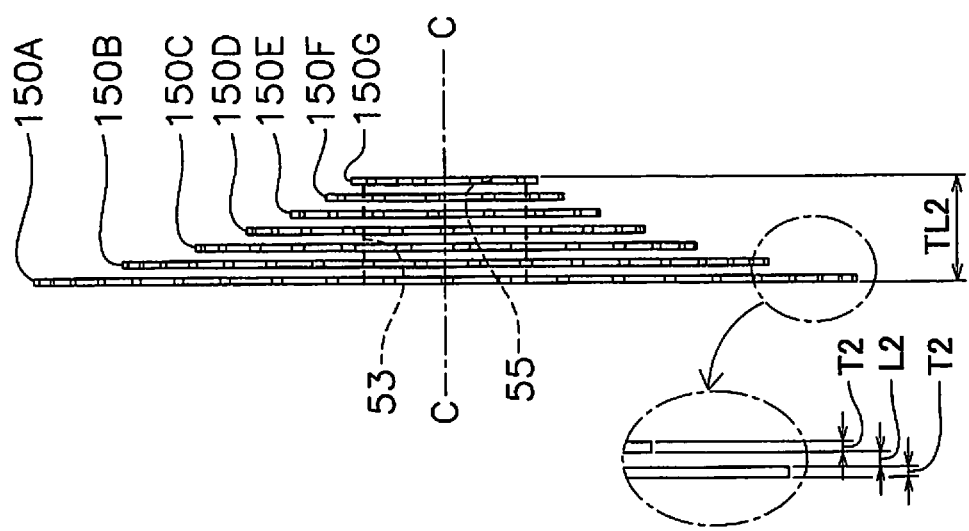

As shown in FIGS. 2 and 5, the rear sprocket assembly 150 is configured to be mounted on the rear hub assembly 29. The rear sprocket assembly 150 has a rotational central axis. The rotational central axis corresponds to the rear hub shaft 35 or the shaft center C of the rear hub shaft 35.

The rear sprocket assembly 150 is attached to the first tubular member 41 (the first body portion 41a) and the second tubular member 43 (the second body portion 43a). The rear sprocket assembly 150 has a plurality of rear sprockets 150A-150G.

The first to sixth rear sprockets 150A-150F are disposed on the outer peripheral portion of the first tubular member 41 in an axial direction parallel to the shaft center C of the rear hub shaft 35. The first rear sprocket 150A is disposed on the outer peripheral portion of the first tubular member 41 at the rear hub shell 37 side. The first to sixth rear sprockets 150A-150F are arranged on the outer peripheral portion of the first tubular member 41 by the same spline coupling as that in the first embodiment.

The seventh rear sprockets 150G are disposed on the outer peripheral portion of the second tubular member 43 in an axial direction parallel to the shaft center C of the rear hub shaft 35. The seventh rear sprocket 150G is disposed on the outer peripheral portion of the second tubular member 43 so as to be adjacent to the sixth rear sprocket 150F at the most distant position from the first rear sprocket 150A in the axial direction. The seventh rear sprocket 150G is arranged on the outer peripheral portion of the second tubular member 43 by the same spline coupling as that in the first embodiment.

The first rear sprocket 150A is an example of a second sprocket. The second to sixth rear sprockets 150F are an example of five additional sprockets. The seventh rear sprocket 150G is an example of a first sprocket.

In the second embodiment, the first tubular member 41 is formed so as to be shorter than that of the first embodiment in the axial direction. The second tubular member 43 is formed so as to be shorter than that of the first embodiment in the axial direction. Total number of the first to sixth rear sprockets 150A-150F is smaller than total number of the first to ninth rear sprockets 50A-50I in the first embodiment. Also, number of the seventh rear sprocket 150G is smaller than number of the tenth and eleventh rear sprockets 50J, 50K in the first embodiment.

Layouts of the first to seventh rear sprockets 150A-150G will be described below in detail. The first to seventh rear sprockets 150A-150G are arranged on the first tubular member 41 in alphabetical order.

Specifically, the second to sixth rear sprockets 150B-150F are positioned between the first rear sprocket 150A and the seventh rear sprocket 150G in the axial direction parallel to the shaft center C of the rear hub shaft 35.

The second rear sprocket 150B is positioned between the first rear sprocket 150A and the third rear sprocket 150C in the axial direction. The third rear sprocket 150C is positioned between the second rear sprocket 150B and the fourth rear sprocket 150D in the axial direction. The fourth rear sprocket 150D is positioned between the third rear sprocket 150C and the fifth rear sprocket 150E in the axial direction. The fifth rear sprocket 150E is positioned between the fourth rear sprocket 150D and the sixth rear sprocket 150F in the axial direction. The sixth rear sprocket 150F is positioned between the fifth rear sprocket 150E and the seventh rear sprocket 150G in the axial direction.

In other words, the sixth rear sprocket 150F is positioned between the first rear sprocket 150A and the seventh rear sprocket 150G in the axial direction. The second rear sprocket 150B is positioned between the first rear sprocket 150A and the sixth rear sprocket 150F in the axial direction. The fifth rear sprocket 150E is positioned between the second rear sprocket 150B and the sixth rear sprocket 150F in the axial direction. The third rear sprocket 150C is positioned between the second rear sprocket 150B and the fifth rear sprocket 150E in the axial direction. The fourth rear sprocket 150D is positioned between the third rear sprocket 150C and the fifth rear sprocket 150E in the axial direction.

Finally, a configuration and a tooth combination of the first to seventh rear sprockets 150A-150G will be described in detail. A root circle diameter of the first rear sprocket 150A is the largest in the first to seventh rear sprockets 150A-150G. Root circle diameters of the second to sixth sprockets 150B-150F are gradually reduced in order of the second to sixth sprockets 150B-150F. A root circle diameter of the seventh sprocket 150G is the smallest in the first to seventh rear sprockets 150A 150G.

The first rear sprocket 150A preferably includes at least one shift assist projection 154. For example, the first rear sprocket 150A includes two shift assist projections 154. The two shift assist projections 154 are provided on the outer peripheral portion of the first rear sprocket 150A. The two shift assist projections 154 are disposed at a predetermined interval around the rear hub shaft 35 (in a circumferential direction).

The axial thickness T2 of each of the first to the seventh rear sprockets 150A-150G is 1.6 mm. The axial length L2 of each space between the axially adjacent rear sprockets is 2.18 mm. The total axial length TL2 between the first rear sprocket 150A and the seventh rear sprocket 150G is 24.28 mm. The total axial length TL2 represents a distance between a surface of the first rear sprocket 150A on an opposite side to the second rear sprocket 150B and a surface of the seventh rear sprocket 150G on an opposite side to the sixth rear sprocket 150F.

The first rear sprocket 150A has a first tooth number (an example of a second tooth number). The first tooth number is more than or equal to forty-four. In the embodiment, for example, the first tooth number is forty-six that is the largest tooth number.

The second rear sprocket 150B has a second tooth number. The second tooth number is thirty six. The third rear sprocket 150C has a third tooth number. The third tooth number is twenty eight. The fourth rear sprocket 150D has a fourth tooth number. The fourth tooth number is twenty two. The fifth rear sprocket 150E has a fifth tooth number. The fifth tooth number is seventeen. The sixth rear sprocket 150F has a sixth tooth number. The sixth tooth number is thirteen.

The seventh rear sprocket 150G has a seventh tooth number (an example of a first tooth number). The seventh tooth number is less than or equal to ten. In the embodiment, for example, the seventh tooth number is ten that is the smallest tooth number.

Third Embodiment

A configuration of a bicycle employing a third embodiment according to the present invention is substantially identical to that of the first embodiment except for a configuration of a rear sprocket assembly 250. Moreover, the configuration of the rear sprocket assembly 250 is substantially identical to that of the second embodiment except for configuration of rear sprockets 250A-250G.

For this reason, in the third embodiment, layouts of the rear sprockets 250A-250G will be described in detail and explanation of the other configuration will be omitted. The configurations omitted herein conform to the configuration according to the first and second embodiments. The same configurations as those in the first and second embodiments have the same reference numerals.

Figure 6:
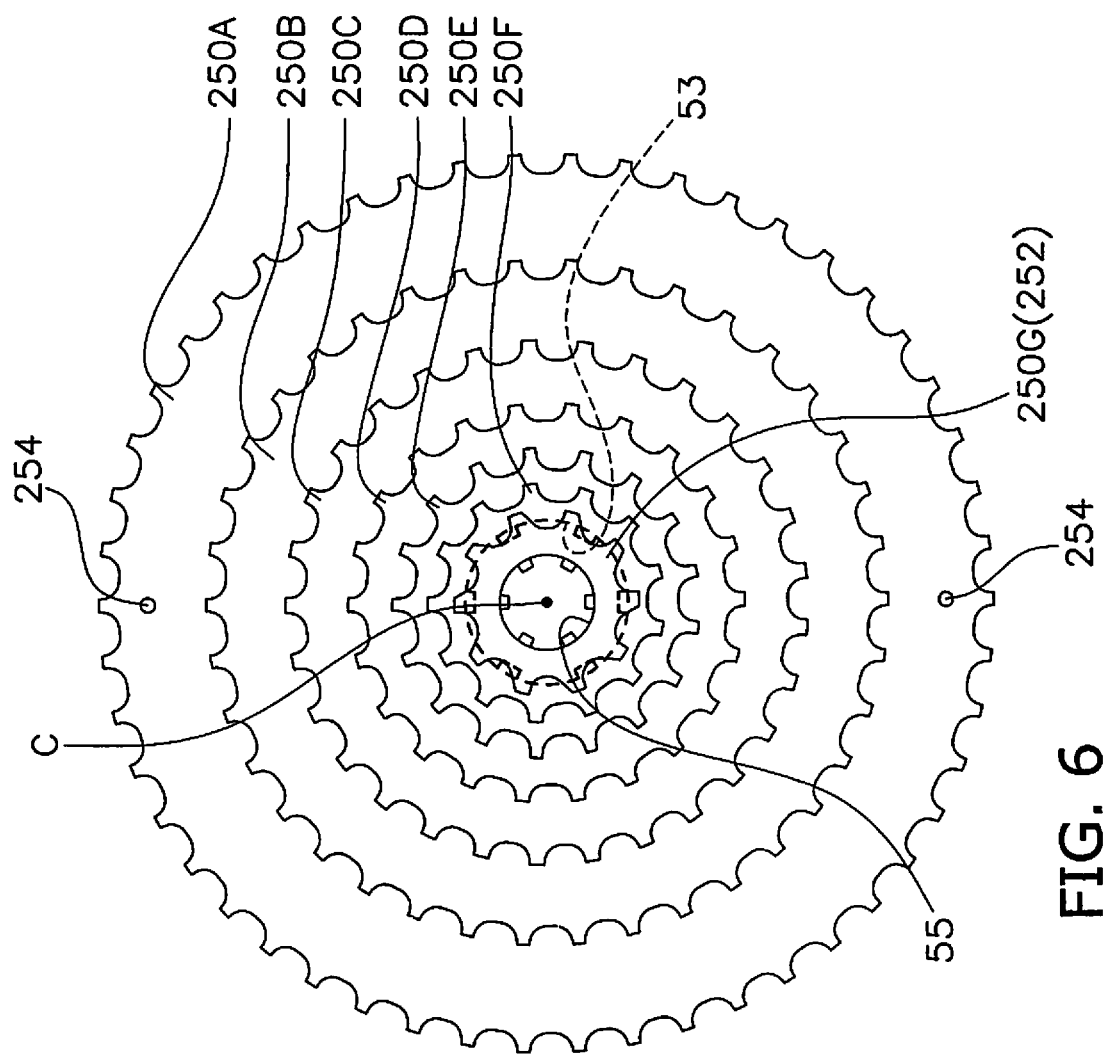
FIG. 6 is a front view and a side view of a rear sprocket assembly according to the third embodiment.
Figure 6:
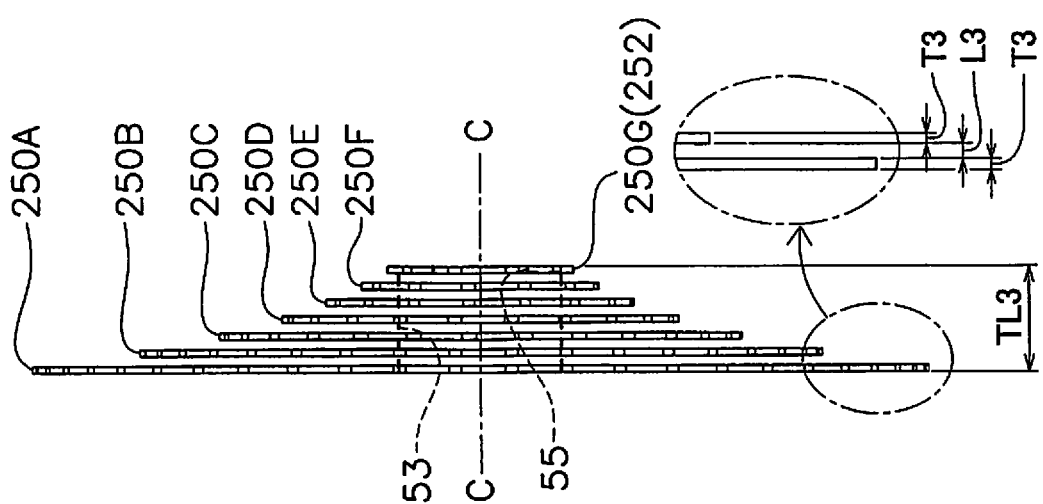

As shown in FIG. 2 and FIG. 6, the rear sprocket assembly 250 is attached to the first tubular member 41 (the first body portion 41a) and the second tubular member 43 (the second body portion 43a). The rear sprocket assembly 250 has a plurality of rear sprockets 250A-250G.

The first to sixth rear sprockets 150A-150F are disposed on the outer peripheral portion of the first tubular member 41 in the same manner as the second embodiment. The seventh rear sprocket 150G is disposed on the outer peripheral portion of the second tubular member 43 in the same manner as the second embodiment.

The first to seventh rear sprockets 150A-150G is arranged respectively on the outer peripheral portions of the first and second tubular member 41, 43 by the same spline coupling as that in the first embodiment.

A root circle diameter of the first rear sprocket 250A is the largest in the first to seventh rear sprockets 250A-250G. Root circle diameters of the second to sixth sprockets 250B-250F are gradually reduced in order of the second to sixth sprockets 250B-250F. A root circle diameter of the seventh rear sprocket 250G is the smallest in the first to seventh rear sprockets 250A-250G.

The first rear sprocket 250A preferably includes at least one shift assist projection 254. For example, the first rear sprocket 250A includes two shift assist projections 254. The two shift assist projections 254 are provided on the outer peripheral portion of the first rear sprocket 250A. The two shift assist projections 254 are disposed at a predetermined interval around the rear hub shaft 35 (in a circumferential direction).

The axial thickness T3 of each of the first to the seventh rear sprockets 250A-250G is 1.6 mm. The axial length L3 of each space between the axially adjacent rear sprockets is 2.18 mm. The total axial length TL3 between the first rear sprocket 250A and the eleventh rear sprocket 250K is 24.28 mm. The total axial length TL3 represents a distance between a surface of the first rear sprocket 250A on an opposite side to the second rear sprocket 250B and a surface of the seventh rear sprocket 250G on an opposite side to the sixth rear sprocket 250F.

The first rear sprocket 250A has a first tooth number (an example of a second tooth number). The first tooth number is more than or equal to forty-four. In the embodiment, for example, the first tooth number is fifty that is the largest tooth number.

The second rear sprocket 250B has a second tooth number. The second tooth number is thirty eight. The third rear sprocket 250C has a third tooth number. The third tooth number is twenty nine. The fourth rear sprocket 250D has a fourth tooth number. The fourth tooth number is twenty two. The fifth rear sprocket 250E has a fifth tooth number. The fifth tooth number is seventeen. The sixth rear sprocket 250F has a sixth tooth number. The sixth tooth number is thirteen.

The seventh rear sprocket 250G has a seventh tooth number (an example of a first tooth number). The seventh tooth number is less than or equal to ten. In the embodiment, for example, the seventh tooth number is ten that is the smallest tooth number.

Fourth Embodiment

A configuration of a bicycle employing a fourth embodiment according to the present invention is substantially identical to that of the first embodiment except for a configuration of a rear sprocket assembly 350. For this reason, in the fourth embodiment, the rear sprocket assembly 350 will be described in detail and explanation of the other configuration will be omitted. The configurations omitted herein conform to the configuration according to the first embodiment. The same configurations as those in the first embodiment have the same reference numerals.

Figure 7:
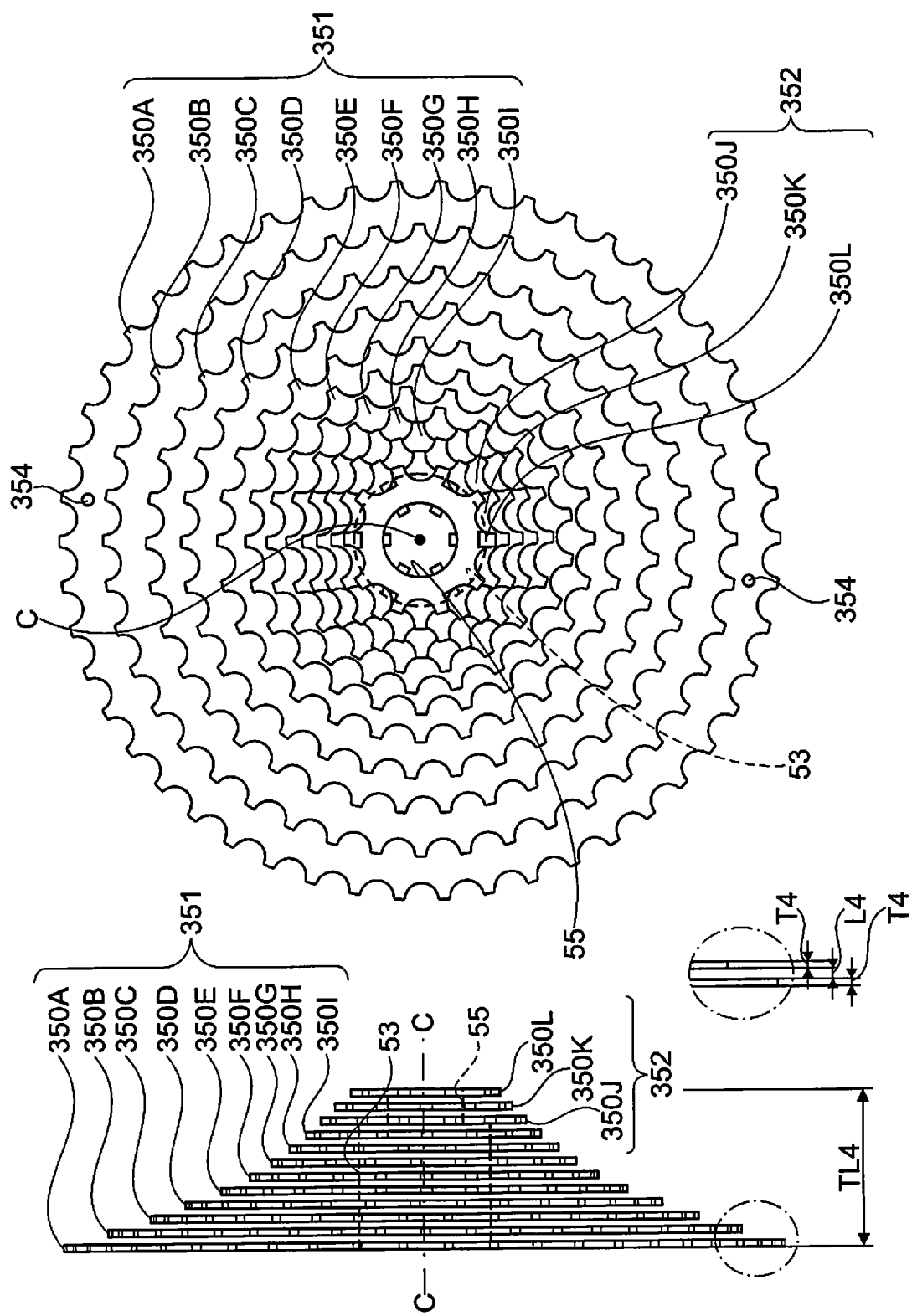
FIG. 7 is a front view and a side view of a rear sprocket assembly according to the fourth embodiment.

As shown in FIGS. 2 and 7, the rear sprocket assembly 350 is configured to be mounted on the rear hub assembly 29. The rear sprocket assembly 350 has a rotational central axis. The rotational central axis corresponds to the rear hub shaft 35 or a shaft center C of the rear hub shaft 35.

The rear sprocket assembly 350 is attached to a first tubular member 41 and a second tubular member 43. The rear sprocket assembly 350 has a plurality of rear sprockets 350A-350L.

For example, the rear sprocket assembly 350 has a first rear sprocket assembly 351 and a second rear sprocket assembly 352.

The first rear sprocket assembly 351 is attached to the first tubular member 41 (the first body portion 41a). The first rear sprocket assembly 351 has first to ninth rear sprockets 350A-350I. The first to ninth rear sprockets 350A-350I are arranged on the outer peripheral portion of the first tubular member 41 in an axial direction parallel to the shaft center C of the rear hub shaft 35. The first rear sprocket 350A is disposed on the outer peripheral portion of the first tubular member 41 at a rear hub shell 37 side. The first to ninth rear sprockets 350A-350I are arranged on the outer peripheral portion of the first tubular member 41 by the same spline coupling as that in the first embodiment.

The second rear sprocket assembly 352 is attached to the second tubular member 43 (the second body portion 43a). The second rear sprocket assembly 352 has tenth to twelfth rear sprockets 350J-350L. The tenth to twelfth rear sprockets 350J-350L are arranged on the outer peripheral portion of the second tubular member 43 in the axial direction parallel to the shaft center C of the rear hub shaft 35. The tenth rear sprocket 350J is disposed on the outer peripheral portion of the second tubular member 43 so as to be adjacent to the ninth rear sprocket 350I in the axial direction. The eleventh rear sprocket 350K is disposed on the outer peripheral portion of the second tubular member 43 so as to be adjacent to the tenth rear sprocket 350J in the axial direction. The twelfth rear sprocket 350K is disposed on the outer peripheral portion of the second tubular member 43 so as to be adjacent to the eleventh rear sprocket 350K at the most distant position from the first rear sprocket 350A in the axial direction.

The first rear sprocket 350A is an example of a second sprocket. The second to eleventh rear sprockets 350B-350K are an example of at least five additional sprockets, and at least eight additional rear sprockets. The twelfth rear sprocket 350L is an example of a first sprocket.

Layouts of the first to twelfth rear sprockets 350A-350L will be described below in detail. The first to twelfth rear sprockets 350A-350L are arranged on the first tubular member 41 and the second tubular member 43 in alphabetical order.

Specifically, the second to eleventh rear sprockets 350B-350K are positioned between the first rear sprocket 350A and the twelfth rear sprocket 350L in the axial direction parallel to the shaft center C of the rear hub shaft 35. The second rear sprocket 350B is positioned between the first rear sprocket 350A and the third rear sprocket 350C in the axial direction. The third rear sprocket 350C is positioned between the second rear sprocket 350B and the fourth rear sprocket 350D in the axial direction. The fourth rear sprocket 350D is positioned between the third rear sprocket 350C and the fifth rear sprocket 350E in the axial direction. The fifth rear sprocket 350E is positioned between the fourth rear sprocket 350D and the sixth rear sprocket 350F in the axial direction.

The sixth rear sprocket 350F is positioned between the fifth rear sprocket 350E and the seventh rear sprocket 350G in the axial direction. The seventh rear sprocket 350G is positioned between the sixth rear sprocket 350F and the eighth rear sprocket 350H in the axial direction. The eighth rear sprocket 350H is positioned between the seventh rear sprocket 350G and the ninth rear sprocket 350I in the axial direction. The ninth rear sprocket 350I is positioned between the eighth rear sprocket 350H and the tenth rear sprocket 350J in the axial direction. The tenth rear sprocket 350J is positioned between the ninth rear sprocket 350I and the eleventh rear sprocket 350K in the axial direction. The eleventh rear sprocket 350K is positioned between the tenth rear sprocket 350J and the twelfth rear sprocket 350L in the axial direction.

In other words, the second rear sprocket 350B (an example of a fourth sprocket) is positioned between the first rear sprocket 350A (an example of a second sprocket) and the eleventh rear sprocket 350K (an example of a third sprocket) in the axial direction. The third rear sprocket 350C (an example of a sixth sprocket) is positioned between the second rear sprocket 350B (an example of a fourth sprocket) and the tenth rear sprocket 350J (an example of a fifth sprocket) in the axial direction. The fourth rear sprocket 350D (an example of an eighth sprocket) is positioned between the third rear sprocket 350C (an example of a sixth sprocket) and the ninth rear sprocket 350I (an example of a seventh sprocket) in the axial direction. The fifth rear sprocket 350E (an example of a tenth sprocket) is positioned between the fourth rear sprocket 350D (an example of an eighth sprocket) and the eighth rear sprocket 350H (an example of a ninth sprocket) in the axial direction.

The sixth rear sprocket 350F (an example of a twelfth sprocket) is positioned between the fifth rear sprocket 350E (an example of a tenth sprocket) and the seventh rear sprocket 350G (an example of an eleventh sprocket) in the axial direction. The seventh rear sprocket 350G (an example of an eleventh sprocket) is positioned between the fifth rear sprocket 350E (an example of a tenth sprocket) and the eighth rear sprocket 350H (an example of a ninth sprocket) in the axial direction. The eighth rear sprocket 350H (an example of a ninth sprocket) is positioned between the fourth rear sprocket 350D (an example of an eighth sprocket) and the ninth rear sprocket 350I (an example of a seventh sprocket) in the axial direction. The ninth rear sprocket 350I (an example of a seventh sprocket) is positioned between the third rear sprocket 350C (an example of a sixth sprocket) and the tenth rear sprocket 350J (an example of a fifth sprocket) in the axial direction. The tenth rear sprocket 350J (an example of a fifth sprocket) is positioned between the second rear sprocket 350B (an example of a fourth sprocket) and the eleventh rear sprocket 350K (an example of a third sprocket) in the axial direction. The eleventh rear sprocket 350K (an example of a third sprocket) is positioned between the first rear sprocket 350A (an example of a second sprocket) and the twelfth rear sprocket 350L (an example of a first sprocket) in the axial direction.

Finally, a configuration of the first to twelfth rear sprockets 350A-350L will be described in detail. A root circle diameter of the first rear sprocket 350A is the largest in the first to twelfth rear sprockets 350A-350L. Root circle diameters of the second to eleventh sprockets 350B-350K are gradually reduced in order of the second to eleventh sprockets 350B-350K. A root circle diameter of the twelfth sprocket 350L is the smallest in the first to twelfth rear sprockets 350A-350L.

The first rear sprocket 350A preferably includes at least one shift assist projection 354. For example, the first rear sprocket 350A includes two shift assist projections 354. The two shift assist projections 354 are provided on the outer peripheral portion of the first rear sprocket 350A. The two shift assist projections 354 are disposed at a predetermined interval around the rear hub shaft 35 (in a circumferential direction).

The axial thickness T4 of each of the first to the twelfth rear sprockets 350A-350L is 1.6 mm. The axial length L4 of each space between the axially adjacent rear sprockets is 2.2 mm. The total axial length TL4 between the first rear sprocket 350A and the twelfth rear sprocket 350L is 43.4 mm. The total axial length TL4 represents a distance between a surface of the first rear sprocket 350A on an opposite side to the second rear sprocket 350B and a surface of the twelfth rear sprocket 350L on an opposite side to the eleventh rear sprocket 350K.

The first rear sprocket 350A has a first tooth number (an example of a second tooth number). The first tooth number is more than or equal to forty-four. In the embodiment, for example, the first tooth number is fifty that is the largest tooth number.

The second rear sprocket 350B has a second tooth number. The second tooth number is forty four. The third rear sprocket 350C has a third tooth number. The third tooth number is thirty eight. The fourth rear sprocket 350D has a fourth tooth number. The fourth tooth number is thirty three. The fifth rear sprocket 350E has a fifth tooth number. The fifth tooth number is twenty eight. The sixth rear sprocket 350F has a sixth tooth number. The sixth tooth number is twenty four. The seventh rear sprocket 350G has a seventh tooth number. The seventh tooth number is twenty one. The eighth rear sprocket 350H has an eighth tooth number. The eighth tooth number is eighteen. The ninth rear sprocket 350I has a ninth tooth number. The ninth tooth number is sixteen. The tenth rear sprocket 350J has a tenth tooth number. The tenth tooth number is fourteen. The eleventh rear sprocket 350K has an eleventh tooth number. The eleventh tooth number is twelve.

The twelfth rear sprocket 350L has a twelfth tooth number (an example of a first tooth number). The twelfth tooth number is less than or equal to ten. In the embodiment, for example, the twelfth tooth number is ten that is the smallest tooth number.

Fifth Embodiment

A configuration of a bicycle employing a fifth embodiment according to the present invention is substantially identical to that of the first embodiment except for a configuration of a rear sprocket assembly 450. For this reason, in the fifth embodiment, the rear sprocket assembly 450 will be described in detail and explanation of the other configuration will be omitted. The configurations omitted herein conform to the configuration according to the first embodiment. The same configurations as those in the first embodiment have the same reference numerals.

Figure 8:
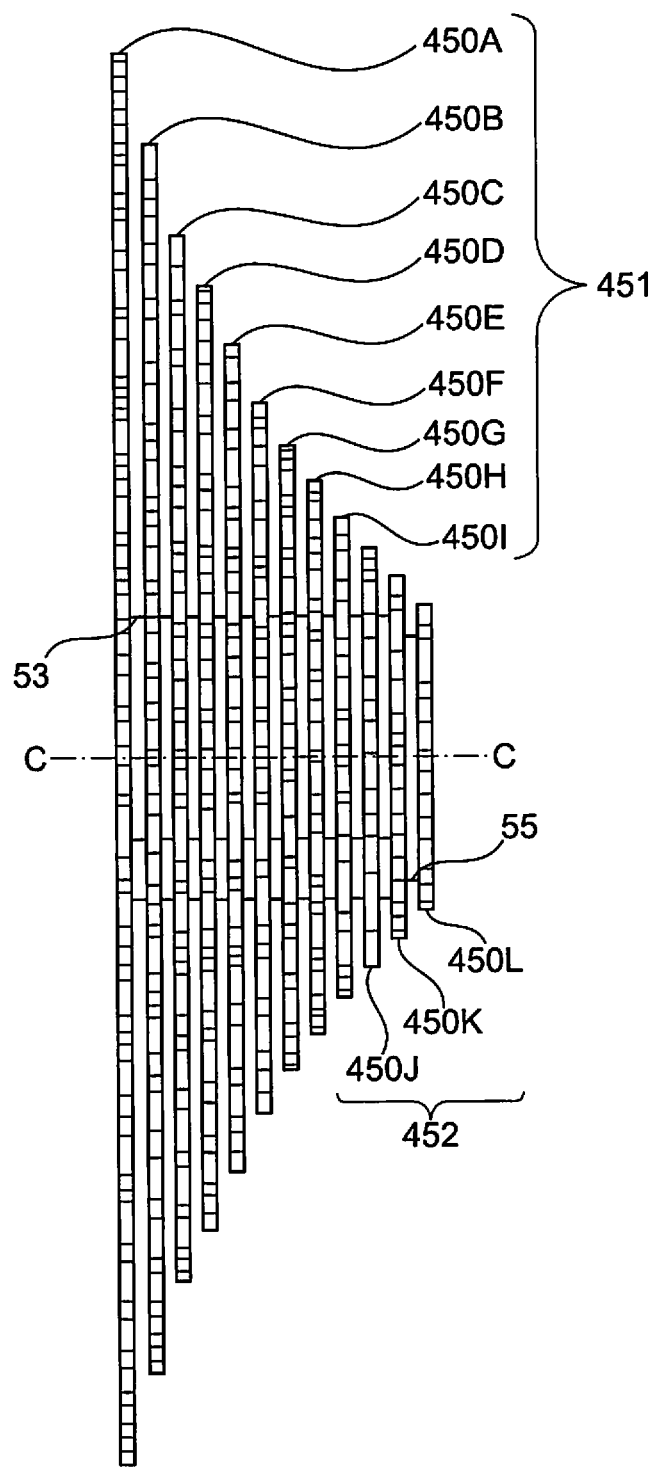
FIG. 8 is a front view of a rear sprocket assembly according to the fifth embodiment.
Figure 9:
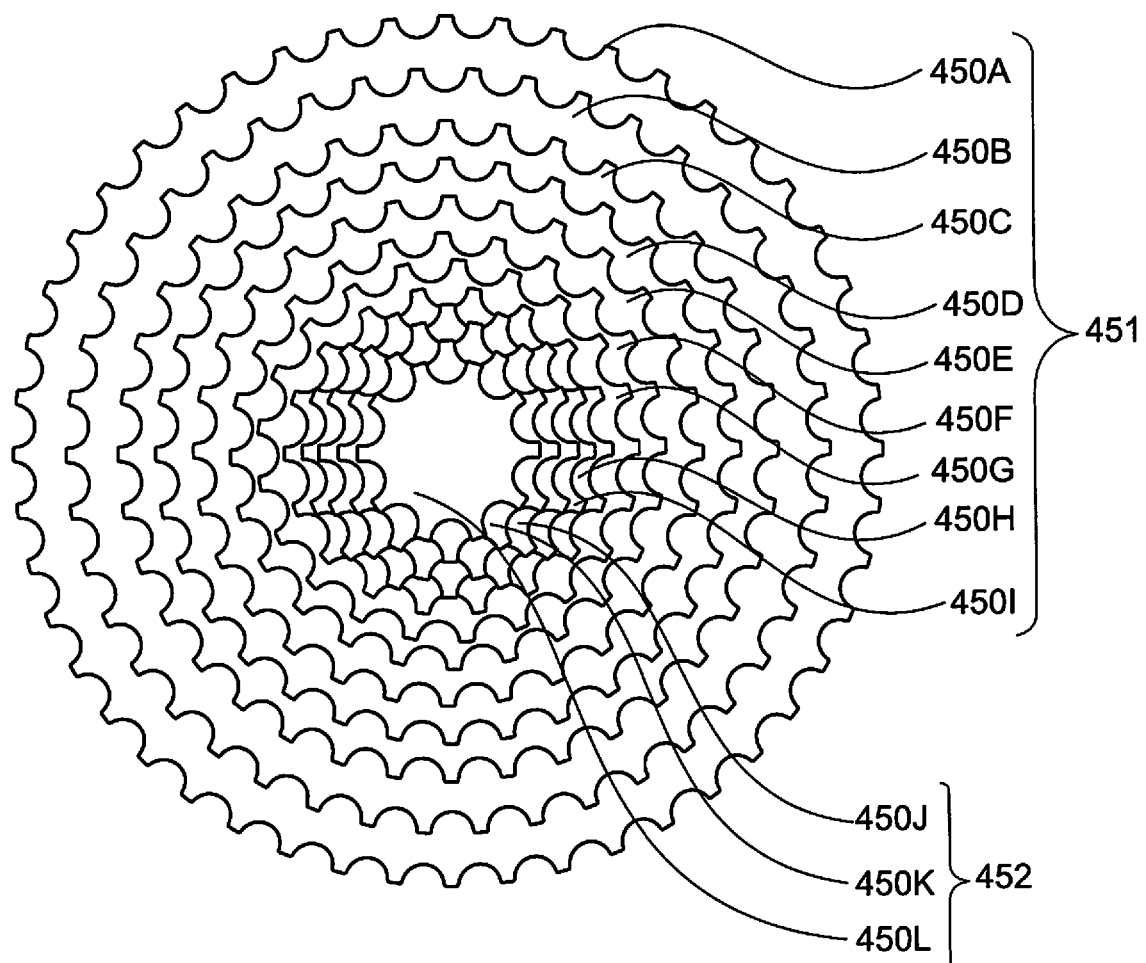
FIG. 9 is a side view of a rear sprocket assembly according to the fifth embodiment.

As shown in FIGS. 2 and 8, the rear sprocket assembly 450 is configured to be mounted on the rear hub assembly 29. The rear sprocket assembly 450 has a rotational central axis. The rotational central axis corresponds to the rear hub shaft 35 or a shaft center C of the rear hub shaft 35.

The rear sprocket assembly 450 is attached to a first tubular member 41 and a second tubular member 43. The rear sprocket assembly 450 has a plurality of rear sprockets 450A-450L.

For example, the rear sprocket assembly 450 has a first rear sprocket assembly 451 and a second rear sprocket assembly 452.

The first rear sprocket assembly 451 is attached to the first tubular member 41 (the first body portion 41a). The first rear sprocket assembly 451 has first to ninth rear sprockets 450A-450I. The first to ninth rear sprockets 450A-450I are arranged on the outer peripheral portion of the first tubular member 41 in an axial direction parallel to the shaft center C of the rear hub shaft 35. The first rear sprocket 450A is disposed on the outer peripheral portion of the first tubular member 41 at a rear hub shell 37 side. The first to ninth rear sprockets 450A-450I are arranged on the outer peripheral portion of the first tubular member 41 by the same spline coupling as that in the first embodiment.

The second rear sprocket assembly 452 is attached to the second tubular member 43 (the second body portion 43a). The second rear sprocket assembly 452 has tenth to twelfth rear sprockets 450J-450L. The tenth to twelfth rear sprockets 450J-450L are arranged on the outer peripheral portion of the second tubular member 43 in the axial direction parallel to the shaft center C of the rear hub shaft 35. The tenth rear sprocket 450J is disposed on the outer peripheral portion of the second tubular member 43 so as to be adjacent to the ninth rear sprocket 450I in the axial direction. The eleventh rear sprocket 450K is disposed on the outer peripheral portion of the second tubular member 43 so as to be adjacent to the tenth rear sprocket 450J in the axial direction. The twelfth rear sprocket 450K is disposed on the outer peripheral portion of the second tubular member 43 so as to be adjacent to the eleventh rear sprocket 450K at the most distant position from the first rear sprocket 450A in the axial direction.

The first rear sprocket 450A is an example of a second sprocket. The second to eleventh rear sprockets 450B-450K are an example of at least five additional sprockets, and at least eight additional rear sprockets. The twelfth rear sprocket 450L is an example of a first sprocket.

Layouts of the first to twelfth rear sprockets 450A-450L will be described below in detail. The first to twelfth rear sprockets 450A-450L are arranged on the first tubular member 41 and the second tubular member 43 in alphabetical order.

Specifically, the second to eleventh rear sprockets 450B-450K are positioned between the first rear sprocket 450A and the twelfth rear sprocket 450L in the axial direction parallel to the shaft center C of the rear hub shaft 35. The second rear sprocket 450B is positioned between the first rear sprocket 450A and the third rear sprocket 450C in the axial direction. The third rear sprocket 450C is positioned between the second rear sprocket 450B and the fourth rear sprocket 450D in the axial direction. The fourth rear sprocket 450D is positioned between the third rear sprocket 450C and the fifth rear sprocket 450E in the axial direction. The fifth rear sprocket 450E is positioned between the fourth rear sprocket 450D and the sixth rear sprocket 450F in the axial direction.

The sixth rear sprocket 450F is positioned between the fifth rear sprocket 450E and the seventh rear sprocket 450G in the axial direction. The seventh rear sprocket 450G is positioned between the sixth rear sprocket 450F and the eighth rear sprocket 450H in the axial direction. The eighth rear sprocket 450H is positioned between the seventh rear sprocket 450G and the ninth rear sprocket 450I in the axial direction. The ninth rear sprocket 450I is positioned between the eighth rear sprocket 450H and the tenth rear sprocket 450J in the axial direction. The tenth rear sprocket 450J is positioned between the ninth rear sprocket 450I and the eleventh rear sprocket 450K in the axial direction. The eleventh rear sprocket 450K is positioned between the tenth rear sprocket 450J and the twelfth rear sprocket 450L in the axial direction.

In other words, the second rear sprocket 450B (an example of a fourth sprocket) is positioned between the first rear sprocket 450A (an example of a second sprocket) and the eleventh rear sprocket 450K (an example of a third sprocket) in the axial direction. The third rear sprocket 450C (an example of a sixth sprocket) is positioned between the second rear sprocket 450B (an example of a fourth sprocket) and the tenth rear sprocket 450J (an example of a fifth sprocket) in the axial direction. The fourth rear sprocket 450D (an example of an eighth sprocket) is positioned between the third rear sprocket 450C (an example of a sixth sprocket) and the ninth rear sprocket 450I (an example of a seventh sprocket) in the axial direction. The fifth rear sprocket 450E (an example of a tenth sprocket) is positioned between the fourth rear sprocket 450D (an example of an eighth sprocket) and the eighth rear sprocket 450H (an example of a ninth sprocket) in the axial direction.

The sixth rear sprocket 450F (an example of a twelfth sprocket) is positioned between the fifth rear sprocket 450E (an example of a tenth sprocket) and the seventh rear sprocket 450G (an example of an eleventh sprocket) in the axial direction. The seventh rear sprocket 450G (an example of an eleventh sprocket) is positioned between the fifth rear sprocket 450E (an example of a tenth sprocket) and the eighth rear sprocket 450H (an example of a ninth sprocket) in the axial direction. The eighth rear sprocket 450H (an example of a ninth sprocket) is positioned between the fourth rear sprocket 450D (an example of an eighth sprocket) and the ninth rear sprocket 450I (an example of a seventh sprocket) in the axial direction. The ninth rear sprocket 450I (an example of a seventh sprocket) is positioned between the third rear sprocket 450C (an example of a sixth sprocket) and the tenth rear sprocket 450J (an example of a fifth sprocket) in the axial direction. The tenth rear sprocket 450J (an example of a fifth sprocket) is positioned between the second rear sprocket 450B (an example of a fourth sprocket) and the eleventh rear sprocket 450K (an example of a third sprocket) in the axial direction. The eleventh rear sprocket 450K (an example of a third sprocket) is positioned between the first rear sprocket 450A (an example of a second sprocket) and the twelfth rear sprocket 450L (an example of a first sprocket) in the axial direction.

Finally, a configuration of the first to twelfth rear sprockets 450A-450L will be described in detail. A root circle diameter of the first rear sprocket 450A is the largest in the first to twelfth rear sprockets 450A-450L. Root circle diameters of the second to eleventh sprockets 450B-450K are gradually reduced in order of the second to eleventh sprockets 450B-450K. A root circle diameter of the twelfth sprocket 450L is the smallest in the first to twelfth rear sprockets 450A-450L.

The first rear sprocket 450A preferably includes at least one shift assist projection (not shown). For example, the first rear sprocket 450A may include six shift assist projections. The six shift assist projections are provided on the outer peripheral portion of the first rear sprocket 450A. The six shift assist projections are disposed at a predetermined interval around the rear hub shaft 35 (in a circumferential direction).

The axial thickness T4 of each of the first to the twelfth rear sprockets 450A-450L is 1.6 mm. The axial length L4 of each space between the axially adjacent rear sprockets is 2.2 mm. The total axial length TL4 between the first rear sprocket 450A and the twelfth rear sprocket 450L is 43.4 mm. The total axial length TL4 represents a distance between a surface of the first rear sprocket 450A on an opposite side to the second rear sprocket 450B and a surface of the twelfth rear sprocket 450L on an opposite side to the eleventh rear sprocket 450K.

The first rear sprocket 450A has a first tooth number (an example of a second tooth number). The first tooth number is more than or equal to forty-eight. In the embodiment, for example, the first tooth number is forty-eight that is the largest tooth number.

The second rear sprocket 450B has a second tooth number. The second tooth number is forty-two. The third rear sprocket 450C has a third tooth number. The third tooth number is thirty-six. The fourth rear sprocket 450D has a fourth tooth number. The fourth tooth number is thirty-two. The fifth rear sprocket 450E has a fifth tooth number. The fifth tooth number is twenty eight. The sixth rear sprocket 450F has a sixth tooth number. The sixth tooth number is twenty four. The seventh rear sprocket 450G has a seventh tooth number. The seventh tooth number is twenty one. The eighth rear sprocket 450H has an eighth tooth number. The eighth tooth number is eighteen. The ninth rear sprocket 450I has a ninth tooth number. The ninth tooth number is sixteen. The tenth rear sprocket 450J has a tenth tooth number. The tenth tooth number is fourteen. The eleventh rear sprocket 450K has an eleventh tooth number. The eleventh tooth number is twelve.

The twelfth rear sprocket 450L has a twelfth tooth number (an example of a first tooth number). The twelfth tooth number is less than or equal to ten. In the embodiment, for example, the twelfth tooth number is ten that is the smallest tooth number.

Other Embodiments (a) In the first to fifth embodiments, the description has been given to the example of the case in which the present invention is applied to a bicycle of a road type. Instead of this, the present invention can be applied to a mountain bike and/or a city cycle etc.

(b) In the first to fifth embodiments, the description has been given to the example of the case in which a plurality of rear sprockets is attached to the first tubular member 41 and one, two or three rear sprockets are disposed in the second tubular member 43. The numbers of the rear sprockets to be disposed in the first tubular member 41 and the second tubular member 43 are not restricted to the first to fourth embodiments but can be set optionally.

(c) In the first to fifth embodiments, the second tubular member 43 is provided separately from the first tubular member 41. Instead of this, the second tubular member 43 may be formed integrally with the first tubular member 41.

(d) In the first to fifth embodiments, the description has been given to the example of the case in which the front sprocket assembly 27b has two front sprockets. The numbers of the front sprockets are not restricted to the first to fourth embodiments but can be set optionally such as one sprocket or three sprockets.

(e) Although the first sprockets 50A, 150A, 250A, 350A and 450A illustrated in the first to fifth embodiments include the shift assist projections 54, 154, 254 354 respectively, the shift assist projections can be omitted from the first sprocket in the first, fourth and fifth embodiment since the difference between the first tooth number and the tooth number of the adjacent sprocket is not so large in comparison with the second and third embodiments. The shift assist projections 154 and 254 can also be omitted from the first sprockets 150A and 250A according to need.

(f) Although the shift assist projection 54, 154, 254 354 is provided to the first sprocket 50A, 150A, 250A, and 350A only in the first to fifth embodiments, such a shift assist projection 54, 154, 254 354 can also be provided to the other sprocket according to need.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the multiple bicycle sprocket assembly. Accordingly, these directional terms, as utilized to describe the multiple bicycle sprocket assembly should be interpreted relative to a bicycle in an upright riding position on a horizontal surface and that is equipped with the multiple bicycle sprocket assembly. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A multiple bicycle sprocket assembly having a rotational central axis and configured to be mounted on a bicycle hub assembly, the multiple bicycle sprocket assembly comprising:
   a first sprocket having a total first tooth number less than or equal to ten and a first hole portion formed on an inner peripheral portion of the first sprocket;
   a second sprocket having a total second tooth number more than or equal to fifty and a second hole portion formed on an inner peripheral portion of the second sprocket, the second sprocket being configured to be directly mounted on the bicycle hub assembly; and
   at least nine additional sprockets positioned between the first sprocket and the second sprocket in an axial direction parallel to the rotational central axis;
   the first hole portion of the first sprocket being smaller than the second hole portion of the second sprocket; and
   a ratio of the total second tooth number to the total first tooth number being equal to or more than five.

2. The multiple bicycle sprocket assembly according to claim 1, wherein
   the total first tooth number is a smallest tooth number of the multiple bicycle sprocket assembly; and
   the total second tooth number is a largest tooth number of the multiple bicycle sprocket assembly.

3. The multiple bicycle sprocket assembly according to claim 1, further comprising
   ten additional sprockets positioned between the first sprocket and the second sprocket in the axial direction parallel to the rotational central axis such that a total sprocket number being twelve.

4. The multiple bicycle sprocket assembly according to claim 1, wherein
   an axial length of each space between axially adjacent sprockets is 2.18 mm.

5. The multiple bicycle sprocket assembly according to claim 1, wherein
   an axial length of each space between axially adjacent sprockets is 2.2 mm.

6. The multiple bicycle sprocket assembly according to claim 1, wherein
an axial thickness of each of the first sprocket, the second sprocket and the additional sprockets is 1.6 mm.

7. The multiple bicycle sprocket assembly according to claim 1, wherein
the first sprocket and the second sprocket are axially spaced apart such that a total axial length between the first sprocket and the second sprocket is 39.4 mm when the total sprocket number is eleven.

8. The multiple bicycle sprocket assembly according to claim 1, wherein
the second sprocket includes at least one shift assist projection.

9. The multiple bicycle sprocket assembly according to claim 1, wherein
the first sprocket and the second sprocket are axially spaced apart such that a total axial length between the first sprocket and the second sprocket is 43.4 mm when the total sprocket number is twelve.

* * * * *